US012056069B2

(12) United States Patent
Lee et al.

(10) Patent No.: US 12,056,069 B2
(45) Date of Patent: Aug. 6, 2024

(54) METHOD AND APPARATUS FOR OPTIMIZING INPUT LATENCY IN A WIRELESS HUMAN INTERFACE DEVICE SYSTEM

(71) Applicant: RAZER (ASIA-PACIFIC) PTE. LTD., Singapore (SG)

(72) Inventors: Kah Yong Lee, Singapore (SG); Chee Oei Chan, Singapore (SG); Jian Yao Lien, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 72 days.

(21) Appl. No.: 17/619,469

(22) PCT Filed: Jun. 18, 2019

(86) PCT No.: PCT/SG2019/050305
§ 371 (c)(1),
(2) Date: Dec. 15, 2021

(87) PCT Pub. No.: WO2020/256631
PCT Pub. Date: Dec. 24, 2020

(65) Prior Publication Data
US 2022/0100685 A1 Mar. 31, 2022

(51) Int. Cl.
*G06F 13/38* (2006.01)
*G06F 13/12* (2006.01)
(Continued)

(52) U.S. Cl.
CPC ............ *G06F 13/20* (2013.01); *G06F 13/382* (2013.01); *G06F 13/4282* (2013.01); *G06F 2213/0042* (2013.01)

(58) Field of Classification Search
CPC .... G06F 13/20; G06F 13/382; G06F 13/4282; G06F 2213/0042; G06F 13/122; H04L 12/2803
(Continued)

(56) References Cited

U.S. PATENT DOCUMENTS 5,881,321 A * 3/1999 Kivolowitz ............ H04N 7/185
348/E5.022
6,587,694 B1 7/2003 Mooney et al.
(Continued)

FOREIGN PATENT DOCUMENTS

CN 102012883 A 4/2011
KR 10-2011-0067066 A 6/2011
(Continued)

OTHER PUBLICATIONS

Lui, Dennis et al, High Data Rate Wireless USB Optical Mouse Solution Using the MC68HC908QY4 and MC68HC908JB12, Designer Reference Manual, NXP, Motorola, Inc., Freescale Semiconductor, Inc., Publication Date: Jan. 2004 in 44 pages.
(Continued)

*Primary Examiner* — Farley Abad
*Assistant Examiner* — Henry W Yu
(74) *Attorney, Agent, or Firm* — Polsinelli PC

(57) ABSTRACT

A method, a computer readable medium, and an apparatus for user input latency optimization are provided. The apparatus may be an HID coupled to a computing device wirelessly. The apparatus may sample user input. The apparatus may transmit the sampled user input to the computing device via a wireless frame. The sampling of the user input may occur before the starting time of the wireless frame. The time difference between the starting time of the sampling of the user input and the starting time of the wireless frame may be a first duration. The first duration may be the time taken to
(Continued)

sample the user input at the apparatus. The wireless frame may be synchronized to a local transmission frame of the computing device.

18 Claims, 10 Drawing Sheets

(51) Int. Cl.
*G06F 13/20* (2006.01)
*G06F 13/42* (2006.01)

(58) Field of Classification Search
USPC .......................... 710/25, 30, 33, 58, 61, 305
See application file for complete search history.

(56) References Cited

U.S. PATENT DOCUMENTS

| | | | |
|---|---|---|---|
| 6,792,247 B2* | 9/2004 | Law | H04W 48/16 |
| | | | 370/503 |
| 7,167,975 B2* | 1/2007 | Hamdi | G06F 13/385 |
| | | | 345/158 |
| 7,209,470 B2 | 4/2007 | McGowan | |
| 7,254,159 B1* | 8/2007 | Lavelle | H04B 1/7156 |
| | | | 370/469 |
| 7,321,755 B2 | 1/2008 | Hulvey | |
| 7,526,594 B2 | 4/2009 | Tseng et al. | |
| 7,626,576 B2 | 12/2009 | Anandakumar et al. | |
| 8,546,706 B2 | 10/2013 | Altman et al. | |
| 8,560,852 B2 | 10/2013 | HongQian et al. | |
| 8,604,365 B2 | 12/2013 | Altman et al. | |
| 8,832,328 B2 | 9/2014 | Raveendran et al. | |
| 9,170,981 B2* | 10/2015 | Jensen | H04L 7/02 |
| 9,237,407 B2* | 1/2016 | Hudson | H04S 3/008 |
| 10,067,898 B2 | 9/2018 | Chiang et al. | |
| 2006/0166621 A1 | 7/2006 | Bae et al. | |
| 2010/0103922 A1* | 4/2010 | Mosko | H04W 56/002 |
| | | | 370/442 |
| 2011/0271191 A1 | 11/2011 | King | |
| 2012/0200774 A1* | 8/2012 | Ehlers, Sr. | H04N 21/4852 |
| | | | 348/E9.034 |
| 2013/0100967 A1* | 4/2013 | Secker | H04L 7/0008 |
| | | | 370/503 |
| 2014/0047141 A1 | 2/2014 | Sadeghi et al. | |
| 2014/0344490 A1 | 11/2014 | Tsfaty et al. | |
| 2015/0062013 A1 | 3/2015 | Solomon et al. | |
| 2015/0092642 A1 | 4/2015 | Geboff et al. | |
| 2016/0037486 A1* | 2/2016 | Wentzloff | H04W 72/30 |
| | | | 370/329 |
| 2017/0373824 A1* | 12/2017 | Mitchler | H04R 25/554 |
| 2018/0019865 A1* | 1/2018 | Lee | H04J 3/0685 |

FOREIGN PATENT DOCUMENTS

| | | |
|---|---|---|
| TW | 201110603 A | 3/2011 |
| WO | WO 2017/119759 A1 | 7/2017 |
| WO | WO 2018/021961 A1 | 2/2018 |

OTHER PUBLICATIONS

Bai, Fengyuan, Clock Synchronization in Android Wi-Fi Direct Network, https://gupea.ub.gu.se/bitstream/2077/38584/1/gupea_2077_38584_1.pdf, University of Gothenburg, Chalmers University of Technology, Aug. 2014 in 20 pages.

Taiwan Intellectual Property Office 1st Office Action; dated Sep. 5, 2023, application #109118318.

* cited by examiner

METHOD AND APPARATUS FOR OPTIMIZING INPUT LATENCY IN A WIRELESS HUMAN INTERFACE DEVICE SYSTEM

TECHNICAL FIELD

Various aspects of this disclosure generally relate to human-computer interaction, and more particularly, to optimizing input latency in a wireless human interface device (HID) system.

BACKGROUND

A human interface device (HID) is a type of computer device usually used by humans that takes input from humans and gives output to humans. Common human interface devices may include keyboard, pointing devices (e.g., mouse, trackball, touchpad, pointing stick, light pen), touchscreen, magnetic stripe reader, graphics tablet, joystick, gamepad, analog stick, webcam, fingerprint scanner, etc. A dongle is a small piece of hardware that connects to a computing device to provide the computing device with additional functionality (e.g., wireless connectivity to human interface devices).

An HID may transmit data via infrared radiation (IR) or radio (e.g., Bluetooth and Wi-Fi). The receiver of the HID may be a dongle that is connected to the computer through a serial or Universal Serial Bus (USB) port, or can be built in. FIG. 1 is a diagram illustrating an example of a wireless HID system 100. In the example, the wireless HID system 100 includes a transmitter 106 of an HID (not shown), a receiver 104 of the HID, and a computer system 102. The receiver 104 may be a dongle that is connected to the computer system 102 via USB port. The transmitter 106 may transmit user input (buttons' action, etc.) sampled at the HID to the receiver 104 via radio frequency, infra-red or other wireless medium.

There are long and inconsistent input latency in traditional wireless HID systems. Therefore, it may be desirable to reduce input latency, thus improving user experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer readable medium, and an apparatus for user input latency optimization are provided. The apparatus may be an HID coupled to a computing device wirelessly. The apparatus may sample user input. The apparatus may transmit the sampled user input to the computing device via a wireless frame. The sampling of the user input may occur before the starting time of the wireless frame. The time difference between the starting time of the sampling of the user input and the starting time of the wireless frame may be a first duration. The first duration may be the time taken to sample the user input at the apparatus. The wireless frame may be synchronized to a local transmission frame of the computing device.

In some embodiments, the user input may be received at the computing device and loaded to a wired communication system of the computing device after the completion of the transmitting. The loading may occur after the starting time of the wireless frame. The time difference between the starting time of the loading and the starting time of the wireless frame may be a second duration. In some embodiments, the second duration may be the time taken for the transmitting of the sampled user input via the wireless frame.

In some embodiments, the starting time of the wireless frame may occur before the starting time of the local transmission frame. The time difference between the starting time of the wireless frame and the starting time of the local transmission frame may be the sum of the second duration and a third duration. In some embodiments, the third duration may be the time taken for the loading of the user input to the wired communication system.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
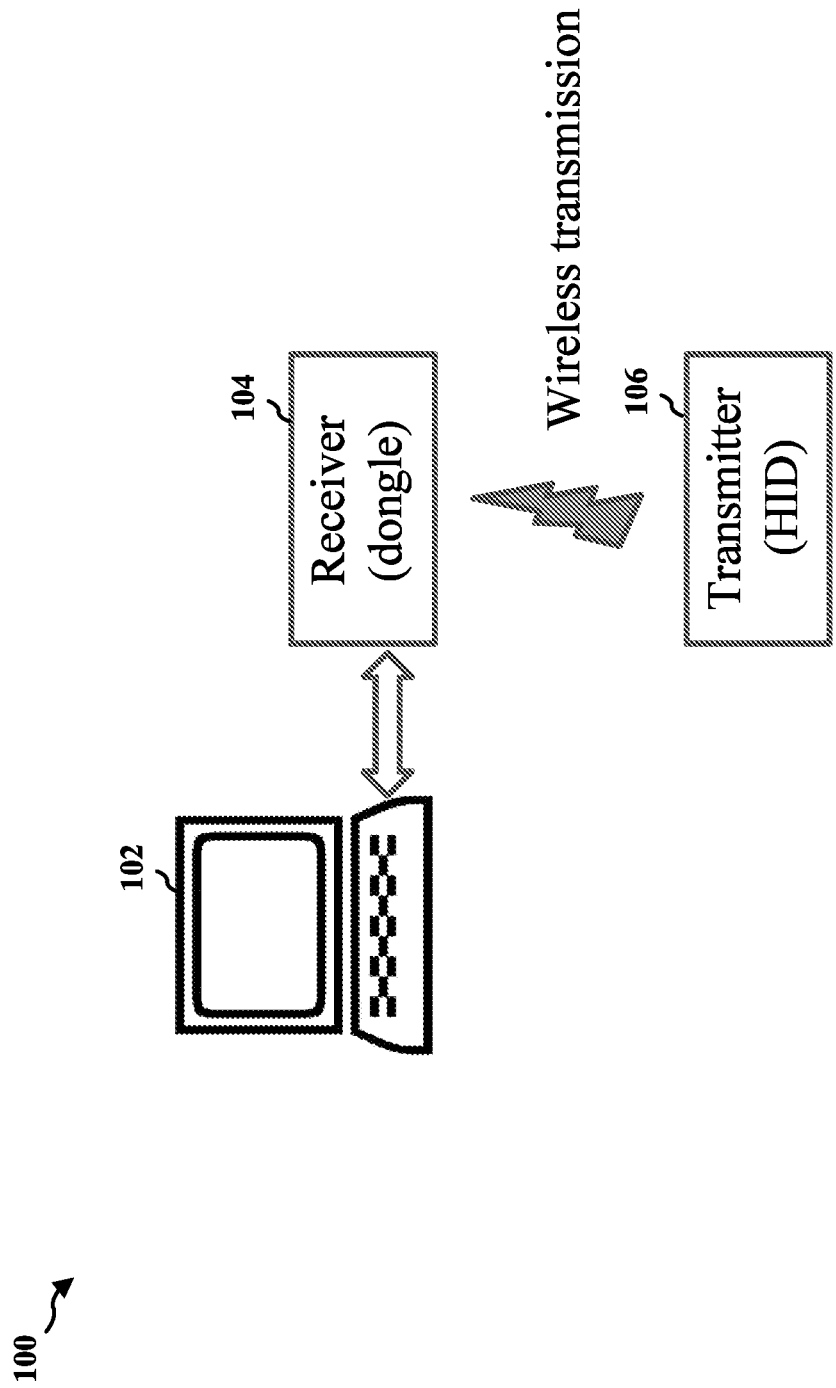
FIG. 1 is a diagram illustrating an example of a wireless HID system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of user input latency optimization will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The input latency of an HID may be primarily limited by the USB polling rate of the host computing device to which the HID is coupled wirelessly. The USB may divide the available bandwidth into frames, and the host computing device controls the frames. A new USB frame may start every millisecond. During a USB frame, isochronous and interrupt devices may get a slot so they are guaranteed the bandwidth they need. Bulk and control transfers may use whatever space is left. An HID may use interrupt endpoints to transfer user input (e.g., HID action) to the host computing device.

Figure 2:
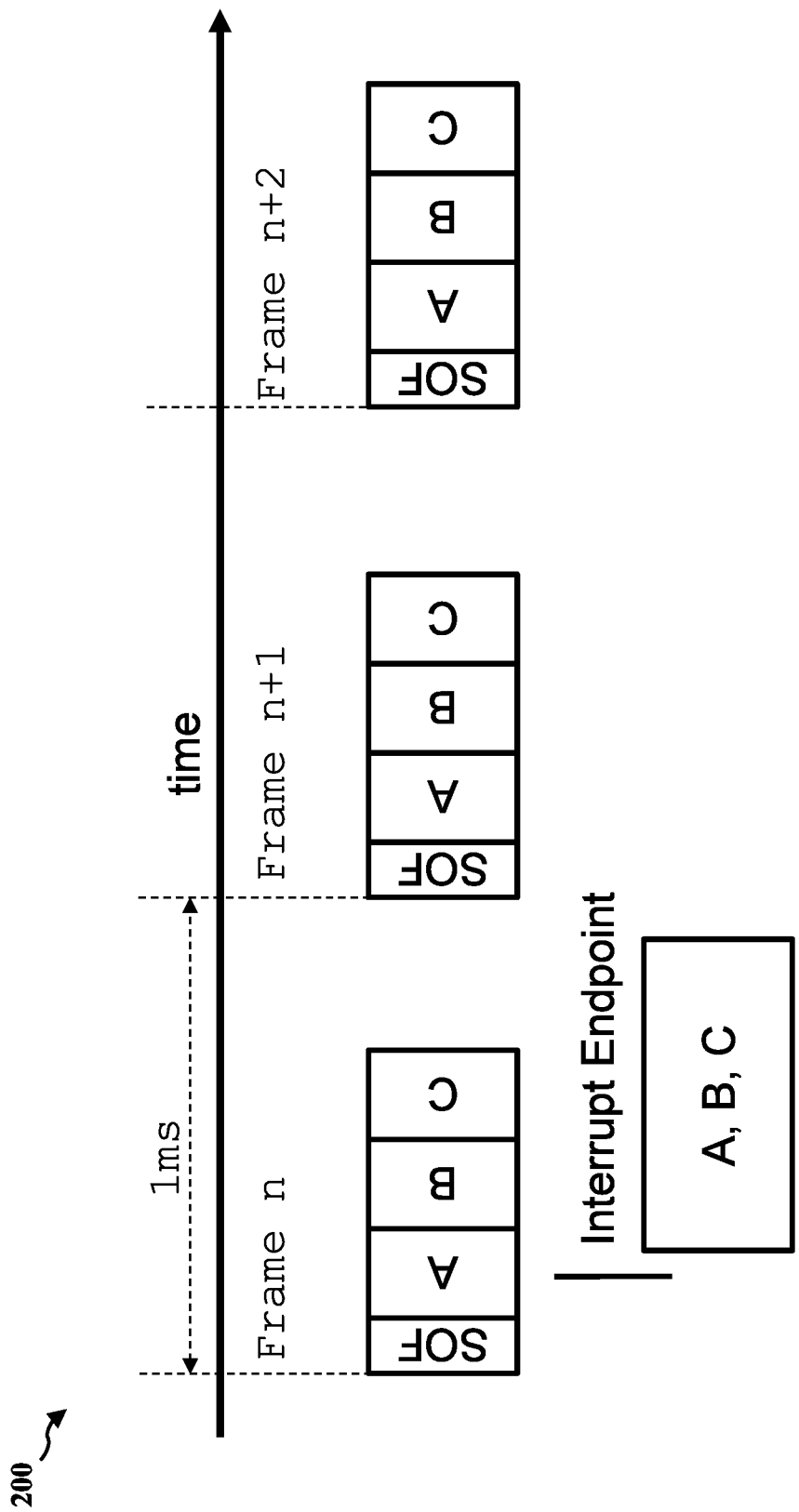
FIG. 2 is a diagram illustrating an example of USB frame configuration.

FIG. 2 is a diagram 200 illustrating an example of USB frame configuration. In the example, USB fames n, n+1, n+2 may be started in sequence (e.g., every millisecond). Each USB frame may include a start of frame (SOF) field and interrupt endpoints A, B, C, which may be used to transfer user input (e.g., HID action) from a USB buffer to the host computing device.

Figure 3:
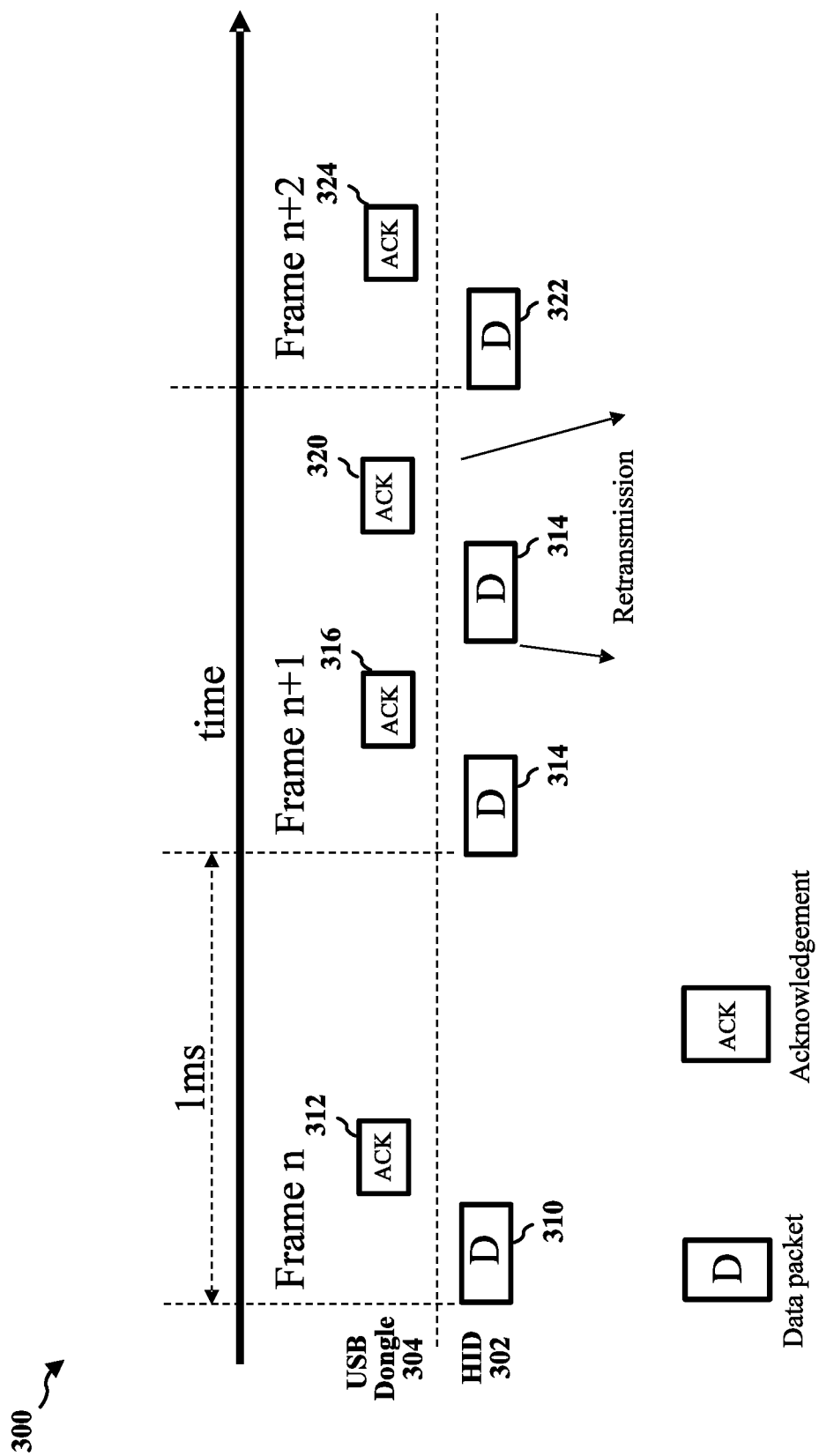
FIG. 3 is a diagram illustrating an example of communications within a wireless HID system.

FIG. 3 is a diagram 300 illustrating an example of communications within a wireless HID system. In the example, during USB frame n, the HID 302 may send a data packet 310 to the host device via the USB dongle 304. The USB dongle 304 may send an acknowledgment 312 back to the HID 302 to acknowledge the receipt of the data packet 310.

During USB frame n+1, the HID 302 may send a data packet 314 to the host device via the USB dongle 304. The USB dongle 304 may send an acknowledgment 316 back to the HID 302 to acknowledge the receipt of the data packet 314. The HID 302 may retransmit the data packet 314. The USB dongle 304 may send an acknowledgment 320 back to the HID 302 to acknowledge the receipt of the retransmitted data packet 314.

During USB frame n+2, the HID 302 may send a data packet 322 to the host device via the USB dongle 304. The USB dongle 304 may send an acknowledgment 324 back to the HID 302 to acknowledge the receipt of the data packet 322.

Figure 4:
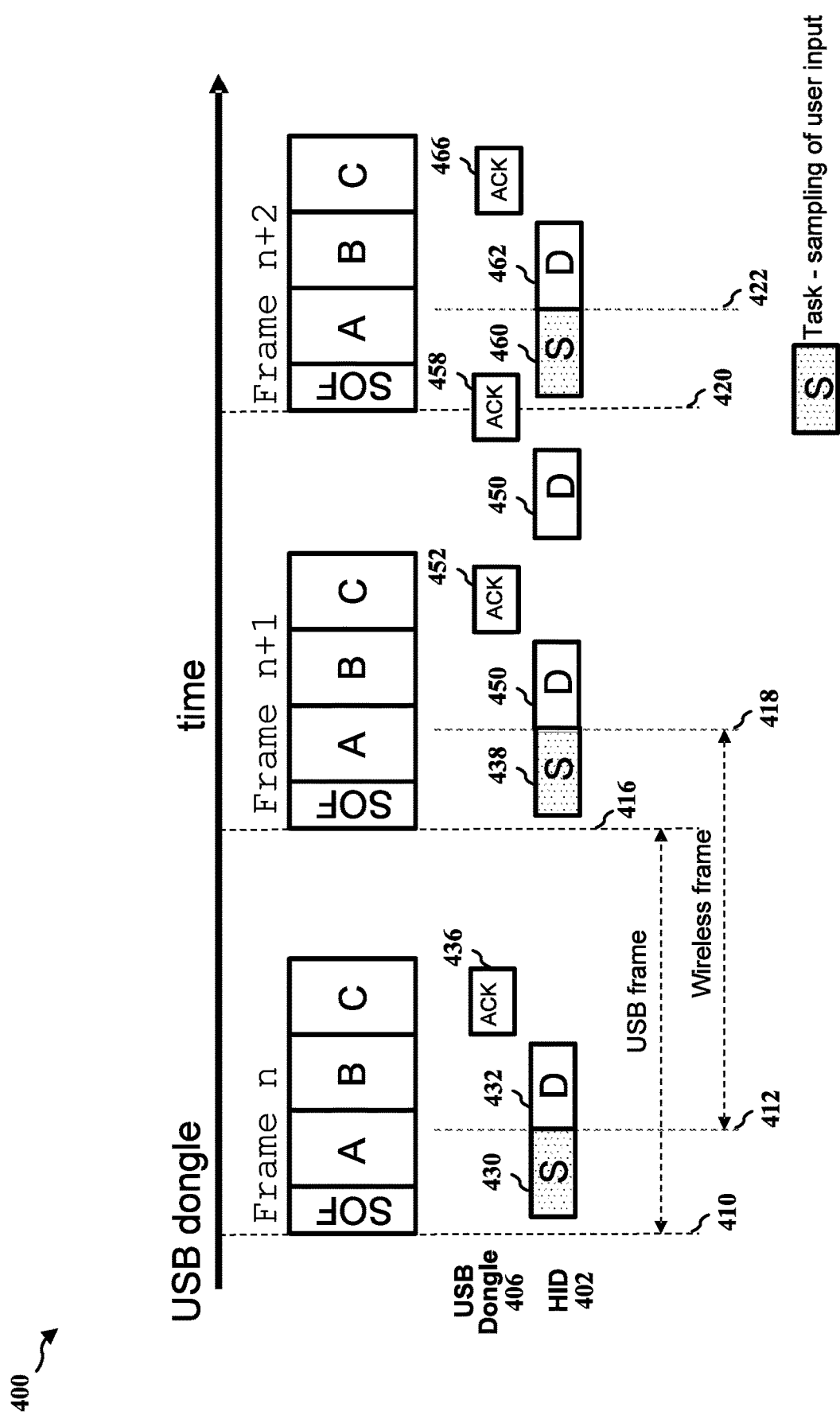
FIG. 4 is a diagram illustrating an example of an implementation of a wireless HID system.

FIG. 4 is a diagram 400 illustrating an example of an implementation of a wireless HID system. In the example, the USB frame n may start at time 410, the USB frame n+1 may start at time 416, and the USB frame n+2 may start at time 420. The wireless frame for transmitting data from the HID 402 to the USB dongle 406 may start at times 412, 418, and 422.

During USB frame n, the HID 402 may sample (at 430) user input. At time 412, the wireless frame starts and the HID 402 may send a data packet 432 containing sampled user input to the host device via the USB dongle 406. The USB dongle 406 may send an acknowledgment 436 back to the HID 402 to acknowledge the receipt of the data packet 432.

During USB frame n+1, the HID 402 may sample (at 438) user input. At time 418, the wireless frame starts again and the HID 402 may send a data packet 450 containing sampled user input to the host device via the USB dongle 406. The USB dongle 406 may send an acknowledgment 452 back to the HID 402 to acknowledge the receipt of the data packet 450. The HID 402 may retransmit the data packet 450. The USB dongle 406 may send an acknowledgment 458 back to the HID 402 to acknowledge the receipt of the retransmitted data packet 450. The acknowledgment 458 may be partially transmitted during USB frame n+2.

During USB frame n+2, the HID 402 may sample (at 460) user input. At time 422, the wireless frame starts again and the HID 402 may send a data packet 462 containing sampled user input to the host device via the USB dongle 406. The USB dongle 406 may send an acknowledgment 466 back to the HID 402 to acknowledge the receipt of the data packet 462.

As shown in FIG. 4, the USB frame and the wireless frame are not synchronized. The sampling timing is not synchronized to the wireless frame or the USB frame. There are three major tasks in a wireless HID system, namely sampling of user input, transmission of user input, and uploading of user input to USB bus/buffer. In traditional wireless HID systems, these three tasks are not synchronized to each other. The input latency is inconsistent as the sampling time and packet transmission time is not synchronized to USB event (e.g., USB frame).

In some embodiments, a set of rules may be outlined to sample, transmit, and load user input. The set of rules may include:
1. Measurement of the duration for data sampling, data transmission (wireless medium), and data loading (to USB buffer);
2. Synchronization of wireless transmission frame to USB frame;
3. Determining the starting time of each task (relative to USB frame).

Figure 5:
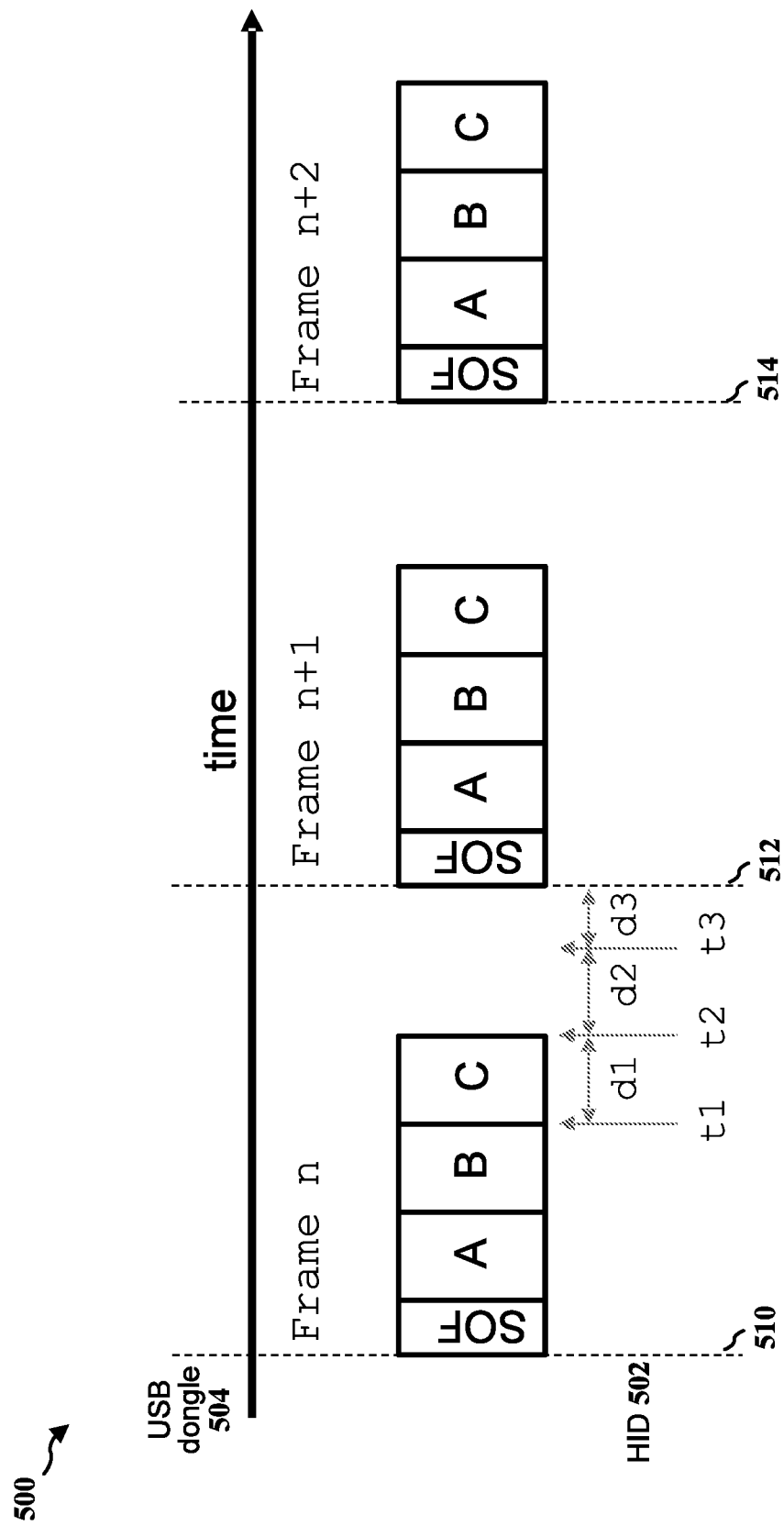
FIG. 5 is a diagram illustrating an example of a wireless HID system of some embodiments.

FIG. 5 is a diagram 500 illustrating an example of a wireless HID system of some embodiments. In the example, the wireless HID system may include an HID 502 and a USB dongle 504. The USB frame n may start at time 510, the USB frame n+1 may start at time 512, and the USB frame n+2 may start at time 514.

During USB frame n, the HID 502 may start to sample user input at time t1. The time taken to sample user input may be duration d1. The end of the duration d1 may be time t2, which may also be the starting time to transmit data from the HID 502 to the USB dongle 504 via a wireless frame. The time taken to transmit data may be duration d2. The end of duration d2 may be time t3, which may also be the starting time to load USB buffer/bus. The time taken to load USB buffer/bus may be duration d3. The end of the duration d3 may be time 512, which is the starting time of the next USB frame (i.e., USB frame n+1).

Figure 6:
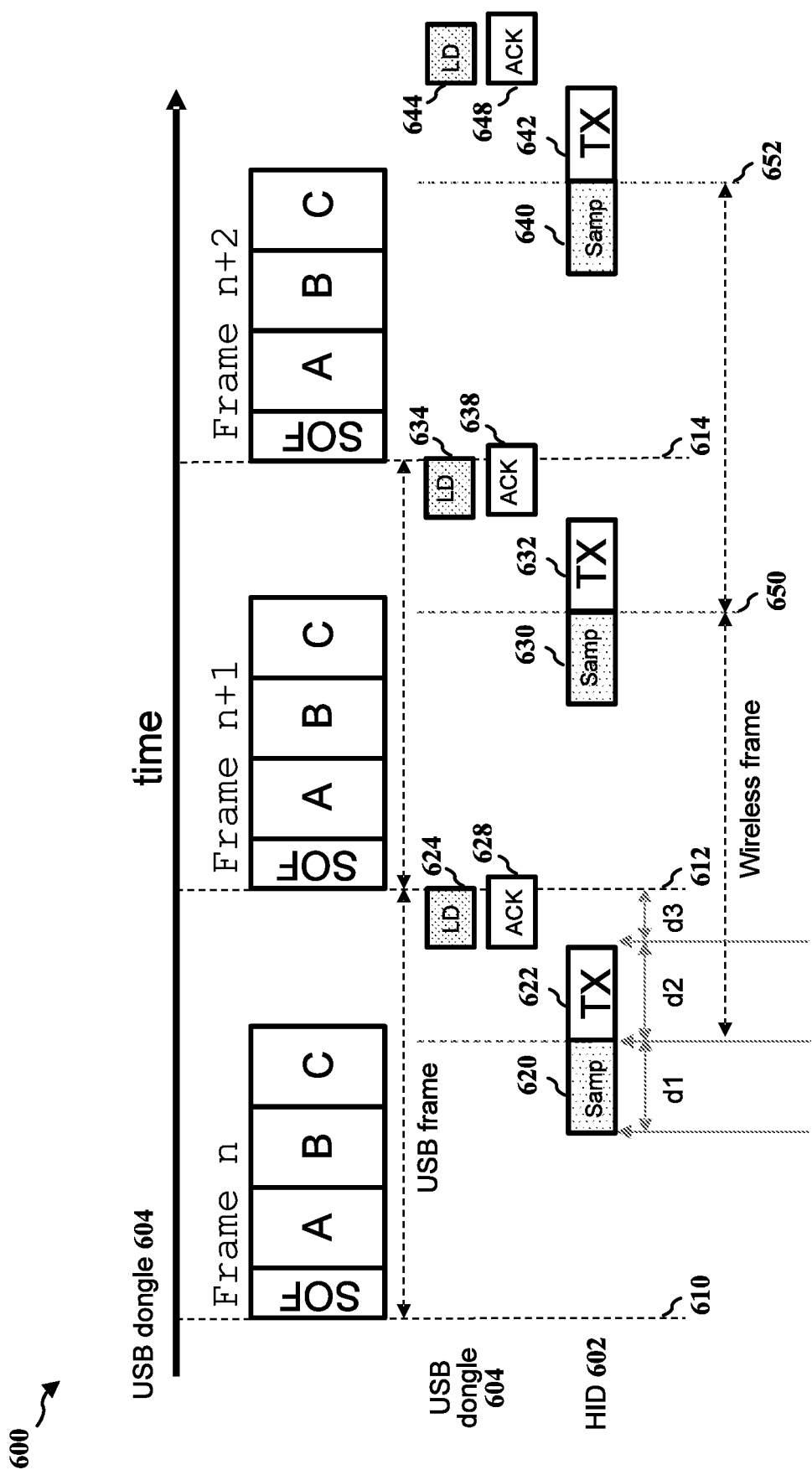
FIG. 6 is a diagram illustrating an example of the relationship between events and tasks in a wireless HID system of some embodiments.

FIG. 6 is a diagram 600 illustrating an example of the relationship between events and tasks in a wireless HID system of some embodiments. In the example, the wireless HID system may include an HID 602 and a USB dongle 604. The USB frame n may start at time 610, the USB frame n+1 may start at time 612, and the USB frame n+2 may start at time 614. The wireless frame may start at times t2, 650, and 652.

During USB frame n, the HID 602 may start to sample (at 620) user input at time t1. The time taken to sample user input may be duration d1. The end of the duration d1 may be time t2, which may also be the starting time to transmit (at 622) the sampled user input data from the HID 602 to the USB dongle 604 via a wireless frame. The time taken to transmit data may be duration d2. The end of duration d2 may be time t3, which may also be the starting time to load (at 624) the user input data to USB buffer/bus. The time taken to load USB buffer/bus may be duration d3. The end of the duration d3 may be time 612, which is the starting time of the next USB frame (i.e., USB frame n+1). Also at time t3, the USB dongle 604 may send an acknowledgment 628 to acknowledge the receipt of user input data.

During USB frame n+1, the HID 602 may sample (at 630) user input. At time 650, the HID 602 may start to transmit (at 632) the sampled user input data from the HID 602 to the USB dongle 604 via a wireless frame. At the completion of the transmission of the user input data, the user input data may be loaded (at 634) to USB buffer/bus. After the completion of the loading, at time 614, the next USB frame (i.e., USB frame n+2) may be started. The USB dongle 604 may send an acknowledgment 638 to acknowledge the receipt of user input data.

During USB frame n+2, the HID 602 may sample (at 640) user input. At time 652, the HID 602 may start to transmit (at 642) the sampled user input data from the HID 602 to the USB dongle 604 via a wireless frame. At the completion of the transmission of the user input data, the user input data may be loaded (at 644) to USB buffer/bus. The USB dongle 604 may send an acknowledgment 648 to acknowledge the receipt of user input data.

In some embodiments, there are three main tasks in the wireless HID system:
Sampling of user input at the HID;
Transmission of user input from the HID to the host computing device wirelessly;
Loading of user input to USB buffer/bus of the host computing device.

In some embodiments, the duration of sampling (referred to as d1) is the time taken to sample user input (e.g., mouse movement, button action, etc.) at the HID. In some embodiments, the duration of transmission (referred to as d2) is the time taken to transmit user input data from the HID to a dongle connected to the host computing device using wireless medium. In some embodiments, the duration of loading (referred as d3) is the time taken to transfer the user input from microcontroller unit (MCU) (e.g., of the dongle) to USB controller of the host computing device.

In some embodiments, the starting time of wireless frame is (d2+d3) before the starting time of USB frame. In some embodiments, the starting time of sampling task (referred to as t1) is (d1) before the starting time of wireless frame. In some embodiments, the starting time of transmission (referred to as t2) is aligned with the starting time of wireless frame. In some embodiments, the starting time of loading (referred to as t3) is after the completion of wireless transmission (i.e., t3=t2+d2).

In some embodiments, in order to reduce input latency in a wireless HID system, the wireless data transmission slot may be synchronized to USB frame according to the relationship between events and tasks described above with reference to FIGS. 5 and 6. In some embodiments, there is a clock synchronization mechanism between the dongle and the HID. The detailed description of clock synchronization may be found, e.g., in WO Publication No. 2018021961A1.

In some embodiments, a method for reducing input latency from an HID to a host computer is provided. The method may include storing input data received from the HID to a USB buffer before transmitting the input data to the host computer. The host computer may connect to a dongle via a USB port to repeatedly receive data packets through USB frames. The dongle may communicate wirelessly with the HID to repeatedly receive data packets via wireless frames.

In some embodiments, the method may include measuring a first duration d1 for input data sampling, a second duration d2 for input data wireless transmission from the HID to the dongle, and a third duration d3 for loading input data to the USB buffer that resides in the USB port. In some embodiments, the method may include aligning a task starting time t2 for the input data wireless transmission to be (d2+d3) before the starting time of the USB frame. In some embodiments, the method may include aligning a task starting time t1 for the input data sampling to be d1 before t2. In some embodiments, the method may include aligning a task starting time t3 for loading the input data to be after the completion of the input data wireless transmission (i.e., t3=t2+d2), wherein t2 is aligned with the starting time of the wireless frame.

Figure 7:
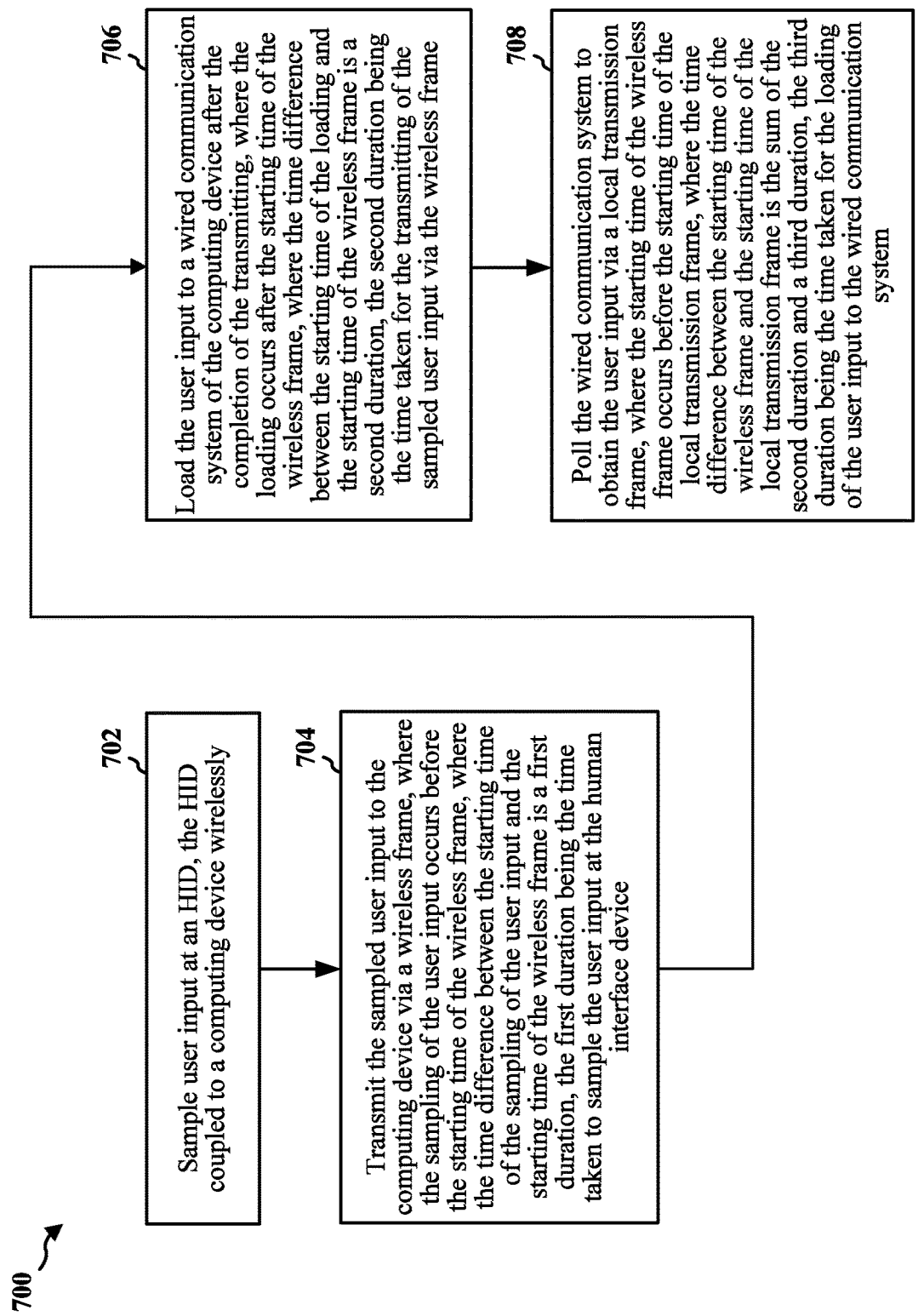
FIG. 7 is a flowchart of a method of user input latency optimization.

FIG. 7 is a flowchart 700 of a method of user input latency optimization. In some embodiments, the operations of the method may corresponding to operations described above with reference to FIGS. 5 and 6. The method may be performed by a first apparatus (e.g., apparatus 802/802' described below with reference to FIG. 8 or 9) and a second apparatus (e.g., apparatus 852/852' described below with reference to FIG. 8 or 10). The first apparatus may be an HID and the second apparatus may be a computing device to which the HID is wirelessly coupled. At 702, the first apparatus may sample user input.

At 704, the first apparatus may transmit the sampled user input to the second apparatus via a wireless frame. The sampling of the user input may occur before the starting time of the wireless frame. The time difference between the starting time of the sampling of the user input and the starting time of the wireless frame is a first duration. The first duration may be the time taken to sample the user input at the first apparatus. In some embodiments, a starting time of the transmitting may be aligned with the starting time of the wireless frame. In some embodiments, the wireless frame may be transmitted via one of radio frequency or infrared radiation. In some embodiments, clock signals at the first apparatus and a receiver of the second apparatus are synchronized At 706, the second apparatus may load the user input received from the first apparatus to a wired communication system of the second apparatus after the completion of the transmitting. The loading may occur after the starting time of the wireless frame. The time difference between the starting time of the loading and the starting time of the wireless frame is a second duration. The second duration may be the time taken for the transmitting of the sampled user input via the wireless frame. In some embodiments, the wired communication system may be USB.

At 708, the second apparatus may poll the wired communication system to obtain the user input via a local transmission frame. The starting time of the wireless frame may occur before the starting time of the local transmission frame. The time difference between the starting time of the wireless frame and the starting time of the local transmission frame is the sum of the second duration and a third duration. The third duration may be the time taken for the loading of the user input to the wired communication system. In some embodiments, the local transmission frame may be a USB frame.

Figure 8:
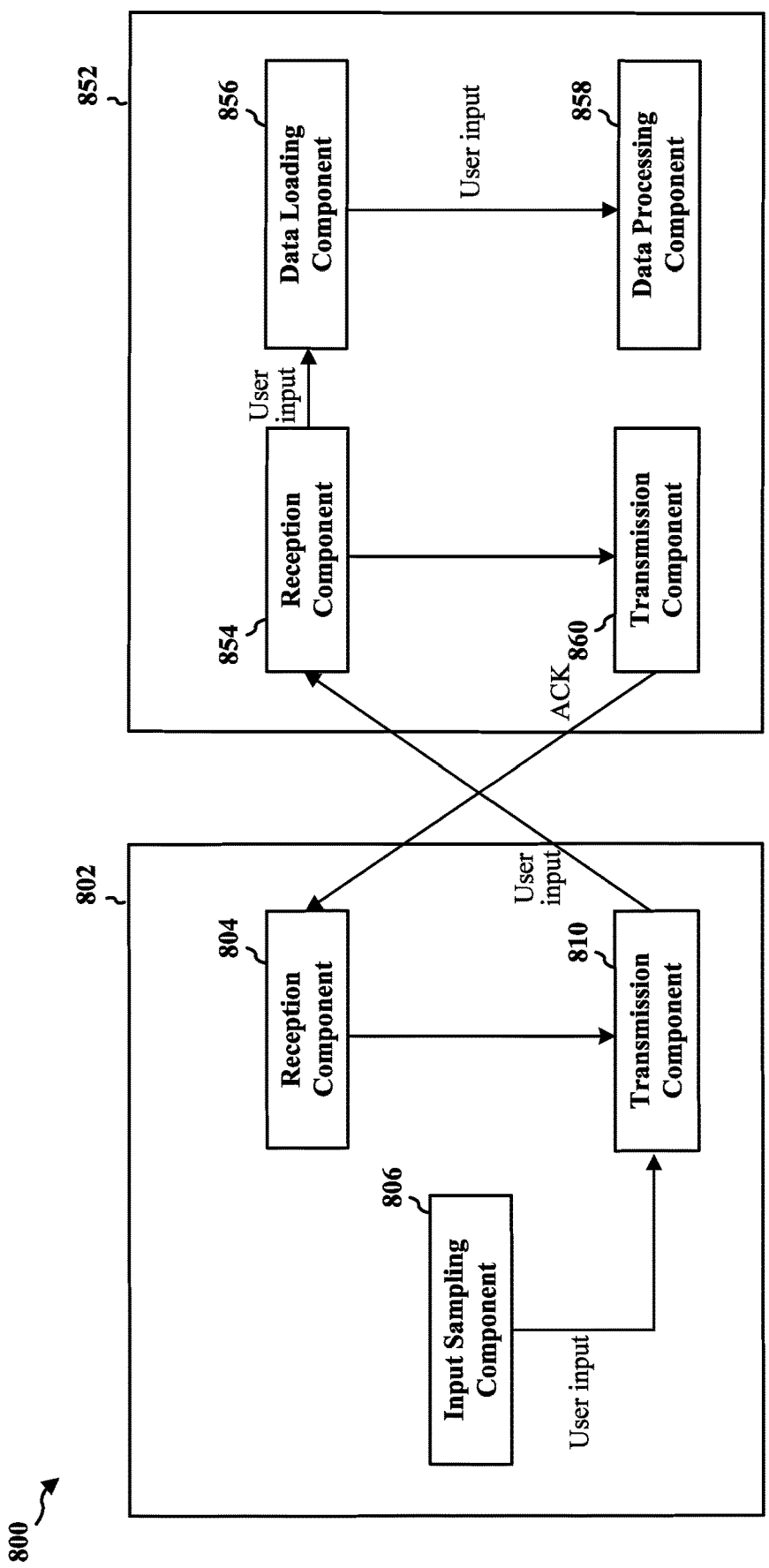
FIG. 8 is a conceptual data flow diagram illustrating the data flow between different means/components in exemplary apparatuses.

FIG. 8 is a conceptual data flow diagram 800 illustrating the data flow between different means/components in exemplary apparatuses 802 and 852. The apparatus 802 may be an HID (e.g., the HID 502 or 602). The apparatus 852 may be a computing device (e.g., the computing device to which the USB dongle 504 or 604 is connected) coupled wirelessly to the apparatus 802.

The apparatus 802 may include a reception component 804 that receives acknowledgment from the apparatus 852. The apparatus 802 may include a transmission component 810 that transmits sampled user input to the apparatus 852. In one embodiment, the transmission component 810 may perform the operations described above with reference to 704 in FIG. 7. The reception component 804 and the transmission component 810 may collaborate to coordinate the communication of the apparatus 802.

The apparatus 802 may include an input sampling component 806 that is configured to sample user input. In one embodiment, the input sampling component 806 may perform the operations described above with reference to 702 in FIG. 7.

The apparatus 852 may include a reception component 854 that receives user input from the apparatus 802. The apparatus 852 may include a transmission component 860 that transmits acknowledgment of the received user input to the apparatus 802. The reception component 854 and the transmission component 860 may collaborate to coordinate the communication of the apparatus 852.

The apparatus 852 may include a data loading component 856 that is configured to load received user input to a wired communication system (e.g., USB). In one embodiment, the data loading component 856 may perform the operations described above with reference to 706 in FIG. 7.

The apparatus 852 may include a data processing component 858 that is configured to processing the user input in the wired communication system. In one embodiment, the data processing component 858 may perform the operations described above with reference to 708 in FIG. 7.

The apparatuses 802 and 852 may include additional components that perform each of the blocks of the algorithm in the aforementioned flowcharts of FIG. 7. As such, each block in the aforementioned flowcharts of FIG. 7 may be performed by a component and the apparatuses may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
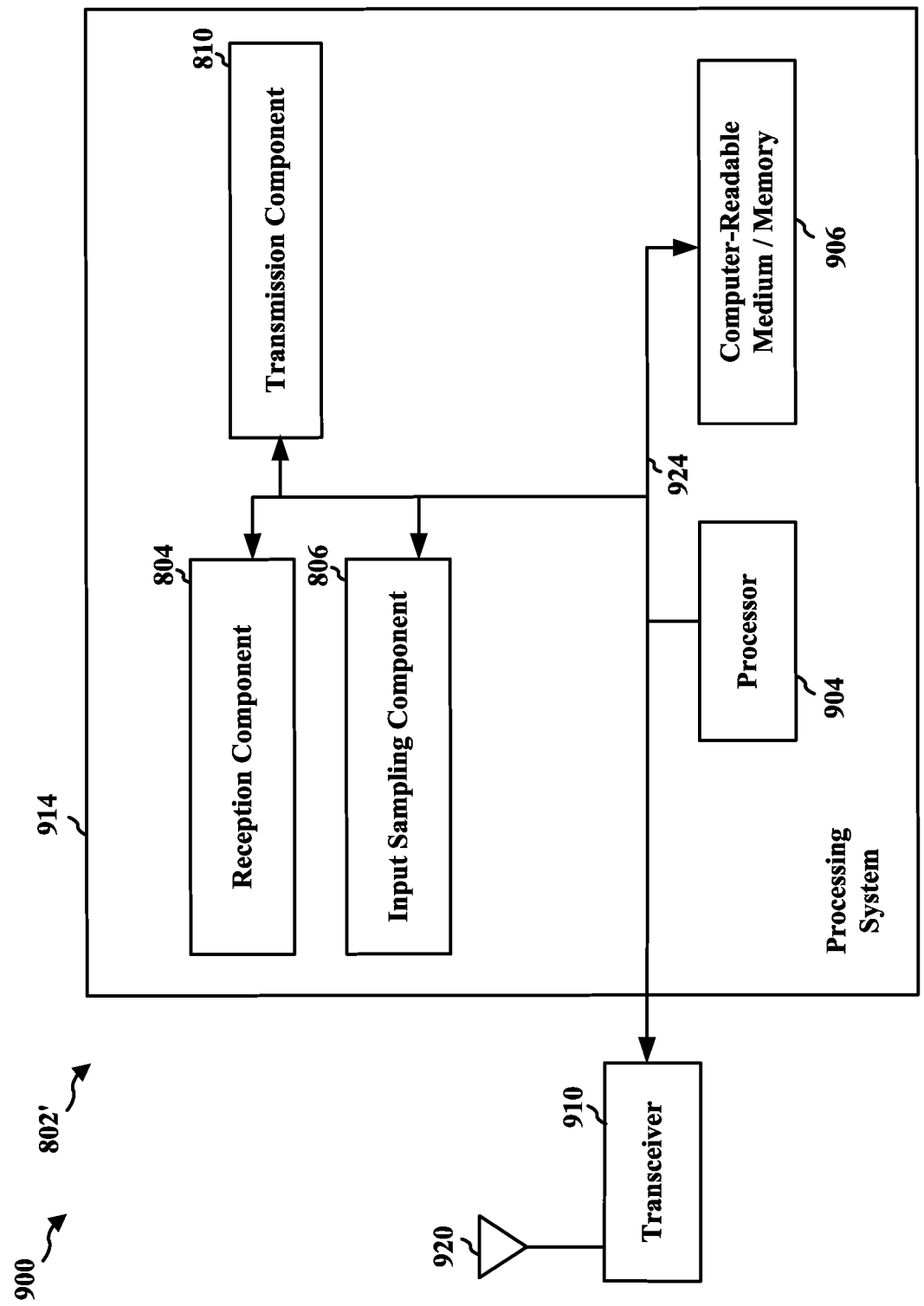
FIG. 9 is a diagram illustrating an example of a hardware implementation for an apparatus employing a processing system.

FIG. 9 is a diagram 900 illustrating an example of a hardware implementation for an apparatus 802' employing a processing system 914. In one embodiment, the apparatus 802' may be the apparatus 802 described above with reference to FIG. 8. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 810, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920.

The processing system 914 includes a processor 904 coupled to a computer-readable medium/memory 906. The processor 904 is responsible for general processing, including the analyzation of data gathered by the apparatus itself through its own sensors and the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 810. The components may be software components running in the processor 904, resident/stored in the computer readable medium/memory 906, one or more hardware components coupled to the processor 904, or some combination thereof.

Figure 10:
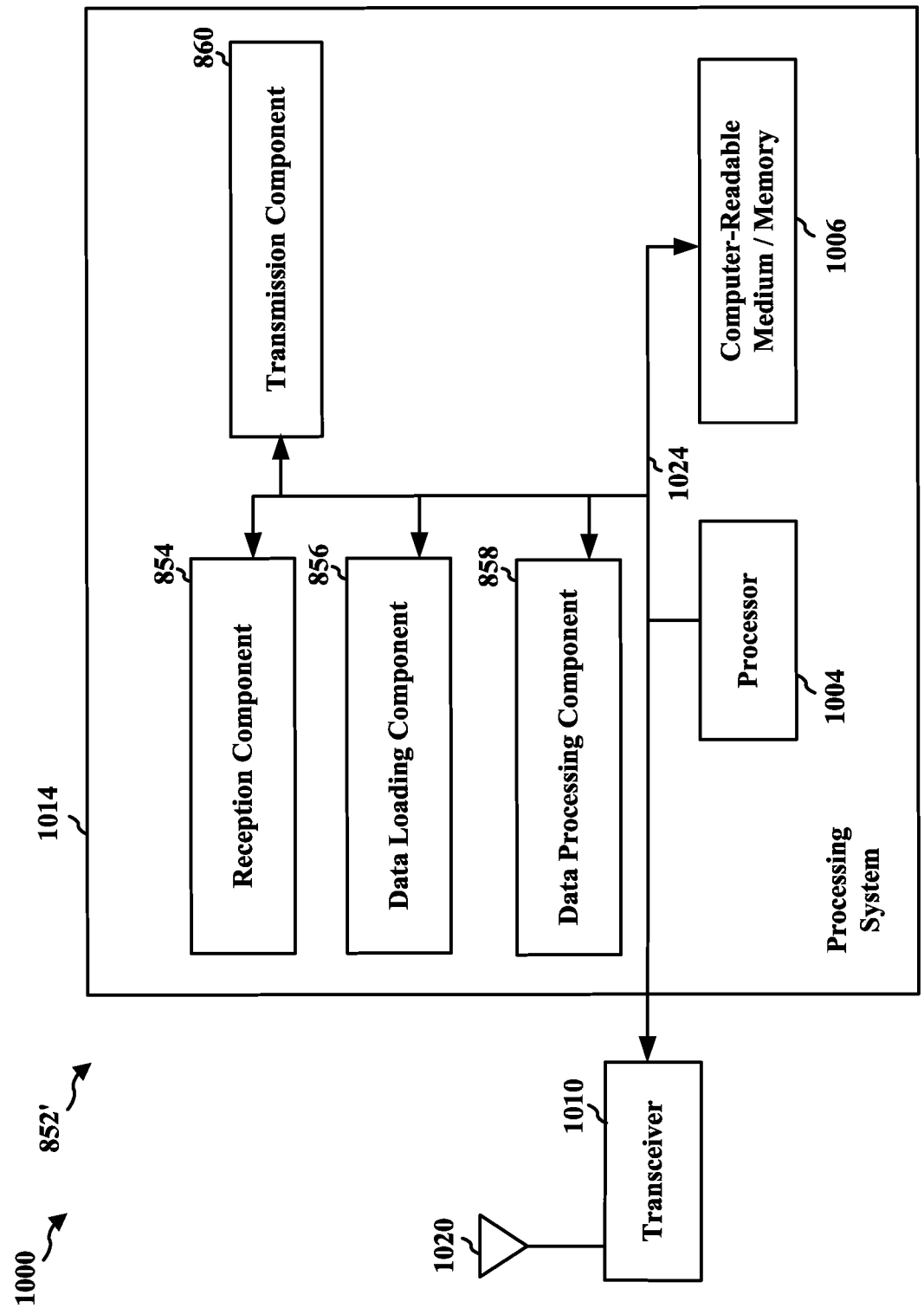
FIG. 10 is a diagram illustrating an example of a hardware implementation for another apparatus employing a processing system.

FIG. 10 is a diagram 1000 illustrating an example of a hardware implementation for an apparatus 852' employing a processing system 1014. In one embodiment, the apparatus 852' may be the apparatus 852 described above with reference to FIG. 8. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 854, 856, 858, 860, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 854. In addition, the transceiver 1010 receives information from the processing system 1014, specifically the transmission component 860, and based on the received information, generates a signal to be applied to the one or more antennas 1020.

The processing system 1014 includes a processor 1004 coupled to a computer-readable medium/memory 1006. The processor 1004 is responsible for general processing, including the analyzation of data gathered by the apparatus itself through its own sensors and the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 854, 856, 858, 860. The components may be software components running in the processor 1004, resident/stored in the computer readable medium/memory 1006, one or more hardware components coupled to the processor 1004, or some combination thereof.

In the following, various aspects of this disclosure will be illustrated:

Example 1 is a method or apparatus for user input latency optimization. The apparatus may be an HID. The apparatus may sample a user input. The apparatus may be coupled to a computing device wirelessly. The apparatus may transmit the sampled user input to the computing device via a wireless frame. The sampling of the user input may occur before the starting time of the wireless frame. The time difference between the starting time of the sampling of the user input and the starting time of the wireless frame is a first duration. The first duration may be the time taken to sample the user input at the apparatus. The wireless frame may be synchronized to a local transmission frame of the computing device.

In Example 2, the subject matter of Example 1 may optionally include that the starting time of the transmitting may be aligned with the starting time of the wireless frame.

In Example 3, the subject matter of any one of Examples 1 to 2 may optionally include that the user input may be received at the computing device and loaded to a wired communication system of the computing device after the completion of the transmitting, where the loading may occur after the starting time of the wireless frame, where the time difference between the starting time of the loading and the starting time of the wireless frame is a second duration.

In Example 4, the subject matter of Example 3 may optionally include that the wired communication system may be USB.

In Example 5, the subject matter of any one of Examples 3 to 4 may optionally include that the second duration is the time taken for the transmitting of the sampled user input via the wireless frame.

In Example 6, the subject matter of any one of Examples 3 to 5 may optionally include that the computing device may poll the wired communication system to obtain the user input via the local transmission frame.

In Example 7, the subject matter of Example 6 may optionally include that the local transmission frame may be a USB frame.

In Example 8, the subject matter of any one of Examples 6 to 7 may optionally include that the starting time of the wireless frame may occur before the starting time of the local transmission frame, where the time difference between the starting time of the wireless frame and the starting time of the local transmission frame may be the sum of the second duration and a third duration.

In Example 9, the subject matter of Example 8 may optionally include that the third duration may be the time taken for the loading of the user input to the wired communication system.

In Example 10, the subject matter of any one of Examples 1 to 9 may optionally include that the wireless frame may be transmitted via one of radio frequency or infrared radiation.

In Example 11, the subject matter of any one of Examples 1 to 10 may optionally include that clock signals at the apparatus and a receiver of the computing device may be synchronized.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of user input latency optimization, the method comprising: sampling a user input at a human interface device, the human interface device coupled to a computing device wirelessly; and
transmitting the sampled user input to the computing device via a wireless frame, wherein the sampling of the user input occurs before a starting time of the wireless frame, wherein a time difference between a starting time of the sampling of the user input and the starting time of the wireless frame is a first duration, the first duration being a time taken to sample the user input at the human interface device, wherein the wireless frame is synchronized to a local transmission frame of the computing device,
wherein the user input is received at the computing device and loaded to a wired communication system of the computing device after a completion of the transmitting, wherein the loading occurs after the starting time of the wireless frame, wherein a time difference between a starting time of the loading and the starting time of the wireless frame is a second duration.

2. The method of claim 1, wherein a starting time of the transmitting is aligned with the starting time of the wireless frame.

3. The method of claim 1, wherein the wired communication system is a Universal Serial Bus.

4. The method of claim 1, wherein the second duration is a time taken for the transmitting of the sampled user input via the wireless frame.

5. The method of claim 1, wherein the computing device polls the wired communication system to obtain the user input via the local transmission frame.

6. The method of claim 5, wherein the local transmission frame is a Universal Serial Bus frame.

7. The method of claim 5, wherein the starting time of the wireless frame occurs before a starting time of the local transmission frame, wherein a time difference between the starting time of the wireless frame and the starting time of the local transmission frame is a sum of the second duration and a third duration.

8. The method of claim 7, wherein the third duration is a time taken for the loading of the user input to the wired communication system.

9. The method of claim 1, wherein the wireless frame is transmitted via one of radio frequency or infrared radiation.

10. The method of claim 1, wherein clock signals at the human interface device and a receiver of the computing device are synchronized.

11. An apparatus for user input latency optimization, the apparatus being a human interface device, the apparatus comprising:
a memory; and
at least one processor coupled to the memory and configured to:
sample a user input at the human interface device, the human interface device coupled to a computing device wirelessly; and
transmit the sampled user input to the computing device via a wireless frame, wherein the sampling of the user input occurs before a starting time of the wireless frame, wherein a time difference between a starting time of the sampling of the user input and the starting time of the wireless frame is a first duration, the first duration being a time taken to sample the user input at the human interface device, wherein the wireless frame is synchronized to a local transmission frame of the computing device,
wherein the user input is received at the computing device and loaded to a wired communication system of the computing device after a completion of the transmitting, wherein the loading occurs after the starting time of the wireless frame, wherein a time difference between a starting time of the loading and the starting time of the wireless frame is a second duration.

12. The apparatus of claim 11, wherein a starting time of the transmitting is aligned with the starting time of the wireless frame.

13. The apparatus of claim 11, wherein the wired communication system is a Universal Serial Bus.

14. The apparatus of claim 11, wherein the second duration is a time taken for the transmitting of the sampled user input via the wireless frame.

15. The apparatus of claim 11, wherein the computing device polls the wired communication system to obtain the user input via the local transmission frame.

16. The apparatus of claim 15, wherein the local transmission frame is a Universal Serial Bus frame.

17. The apparatus of claim 15, wherein the starting time of the wireless frame occurs before a starting time of the local transmission frame, wherein a time difference between the starting time of the wireless frame and the starting time of the local transmission frame is a sum of the second duration and a third duration.

18. The apparatus of claim 17, wherein the third duration is a time taken for the loading of the user input to the wired communication system.

* * * * *